United States Patent
Wong et al.

(10) Patent No.: US 9,501,849 B2
(45) Date of Patent: Nov. 22, 2016

(54) MULTI-DIMENSIONAL VISUALIZATION TOOL FOR BROWSING AND TROUBLESHOOTING AT SCALE

(75) Inventors: Karen Natalie Wong, San Carlos, CA (US); Martin Bednar, San Carlos, CA (US); Manaswi Shukla, San Bruno, CA (US)

(73) Assignee: VMware, Inc., Palo Alto, CA (US)

( * ) Notice: Subject to any disclaimer, the term of this patent is extended or adjusted under 35 U.S.C. 154(b) by 213 days.

(21) Appl. No.: 13/470,217

(22) Filed: May 11, 2012

(65) Prior Publication Data
US 2013/0300747 A1 Nov. 14, 2013

(51) Int. Cl.
*G09G 5/22* (2006.01)
*G06T 11/20* (2006.01)

(52) U.S. Cl.
CPC .................... *G06T 11/206* (2013.01)

(58) Field of Classification Search
CPC ............ G06T 11/206; G06F 3/0659; G06F 17/30994; G06F 3/0635; G06F 11/3433; G06F 2201/81; G06F 3/0605; G06F 17/30961; G06F 2206/1012; G06F 2201/815; G06F 3/067; G06F 9/455; G06F 11/3485; G06F 11/3409; G06F 2206/1008; G06F 3/04886; G06F 17/246; G06F 3/04883; G06F 3/0485; H04L 43/0876; H04L 67/1097; G06Q 10/10
See application file for complete search history.

(56) References Cited

U.S. PATENT DOCUMENTS

| | | | | |
|---|---|---|---|---|
| 5,572,650 | A * | 11/1996 | Antis et al. ................... | 715/853 |
| 5,588,099 | A * | 12/1996 | Mogilevsky et al. ......... | 715/273 |
| 5,634,133 | A * | 5/1997 | Kelley .......................... | 715/209 |
| 5,917,499 | A * | 6/1999 | Jancke et al. ................. | 345/440 |
| 5,999,193 | A * | 12/1999 | Conley et al. ................ | 345/440 |
| 6,085,202 | A * | 7/2000 | Rao et al. ..................... | 715/201 |
| 6,157,864 | A * | 12/2000 | Schwenke ............ | C08F 290/06 700/17 |
| 6,473,407 | B1 * | 10/2002 | Ditmer et al. ................ | 370/252 |
| 6,615,258 | B1 * | 9/2003 | Barry et al. .................. | 709/223 |
| 6,642,945 | B1 * | 11/2003 | Sharpe ............. | G06F 17/30905 345/156 |
| 6,642,946 | B1 * | 11/2003 | Janes et al. ................... | 715/854 |

(Continued)

OTHER PUBLICATIONS

Oracle, Financial Reporting Studio Users Guide 9.3.1, 2007, pp. 1-360.*

(Continued)

*Primary Examiner* — Devona Faulk
*Assistant Examiner* — Charles L Beard

(57) ABSTRACT

A user interface that allows administrators of a virtualized computing environment to easily navigate to and/or search for specific objects, determine relationships between selected objects, and have visibility into the health status of objects in the virtualized computing environment. Objects within a column may be displayed with names, displayed as bars, or aggregated into groups based on the number of objects in the column. Also, in some embodiments, when a user selects one object, objects in other columns that are related to the selected object may be visually distinguished from the other objects, allowing an administrator to easily navigate to related objects.

25 Claims, 9 Drawing Sheets

(56) References Cited

U.S. PATENT DOCUMENTS

| | | | |
|---|---|---|---|
| 6,678,835 B1* | 1/2004 | Shah et al. ................... 714/4.12 |
| 6,684,222 B1* | 1/2004 | Cornelius et al. |
| 6,708,187 B1* | 3/2004 | Shanumgam et al. |
| 6,750,864 B1* | 6/2004 | Anwar ........................ 345/440 |
| 6,788,315 B1* | 9/2004 | Kekic et al. ................. 715/733 |
| 6,792,460 B2 | 9/2004 | Oulu et al. ................... 709/224 |
| 6,829,615 B2* | 12/2004 | Schirmer et al. |
| 6,839,665 B1* | 1/2005 | Meyers ................. G06F 17/27 704/9 |
| 6,948,125 B2* | 9/2005 | Detweiler et al. ............ 715/713 |
| 7,032,022 B1* | 4/2006 | Shanumgam et al. ........ 709/225 |
| 7,143,159 B1* | 11/2006 | Grace ................ H04L 41/0213 709/201 |
| 7,181,684 B2* | 2/2007 | Chittu et al. .................. 715/255 |
| 7,197,517 B2* | 3/2007 | Farrington et al. ........... 707/797 |
| 7,290,222 B2* | 10/2007 | Guido et al. .................. 715/853 |
| 7,315,985 B1* | 1/2008 | Gauvin et al. ................ 715/734 |
| 7,337,412 B2* | 2/2008 | Guido et al. .................. 715/853 |
| 7,378,969 B2* | 5/2008 | Chan et al. .................. 340/572.4 |
| 7,437,676 B1* | 10/2008 | Magdum et al. ............. 715/738 |
| 7,461,077 B1* | 12/2008 | Greenwood |
| 7,565,610 B2* | 7/2009 | Li et al. ........................ 715/736 |
| 7,580,938 B1* | 8/2009 | Pai et al. |
| 7,600,184 B2* | 10/2009 | Smith et al. .................. 715/244 |
| 7,617,243 B2* | 11/2009 | Ramanathan ........ G06Q 10/107 |
| 7,643,029 B2* | 1/2010 | Hao et al. ..................... 345/440 |
| 7,644,371 B2* | 1/2010 | Robertson et al. ........... 715/810 |
| 7,660,823 B2* | 2/2010 | Clover ........................ 707/805 |
| 7,667,582 B1* | 2/2010 | Waldorf ....................... 340/440 |
| 7,712,050 B2* | 5/2010 | Gutberlet et al. ............. 715/853 |
| 7,747,650 B2* | 6/2010 | Zellweger et al. ............ 707/793 |
| 7,750,908 B2* | 7/2010 | Kincaid et al. ............... 345/440 |
| 7,770,100 B2* | 8/2010 | Chamberlain ........ G06F 17/246 715/212 |
| 7,800,613 B2* | 9/2010 | Hanrahan et al. ............ 345/440 |
| 7,908,550 B1* | 3/2011 | Chittu et al. .................. 715/234 |
| 7,979,808 B2* | 7/2011 | Stiso ........................... 715/853 |
| 8,060,817 B2* | 11/2011 | Goldberg et al. ............. 715/212 |
| 8,099,674 B2* | 1/2012 | Mackinlay ........ G06F 17/30554 705/38 |
| 8,228,330 B2* | 7/2012 | Alsbury et al. ............... 345/440 |
| 8,244,874 B1* | 8/2012 | Thireault ..................... 709/224 |
| 8,281,093 B1* | 10/2012 | Krishnan et al. ............. 711/162 |
| 8,286,072 B2* | 10/2012 | Chamberlain ........ G06F 17/212 715/215 |
| 8,341,042 B2* | 12/2012 | Hicks .................... G06Q 10/06 705/30 |
| 8,386,838 B1* | 2/2013 | Byan ........................... 714/6.2 |
| 8,402,361 B2* | 3/2013 | Goldberg ..................... 715/212 |
| 8,489,872 B1* | 7/2013 | Kapoor ........................ 713/100 |
| 8,572,511 B1* | 10/2013 | Barnett ............ G06F 17/30398 715/835 |
| 8,615,581 B2* | 12/2013 | Dare ................... H04L 41/0253 370/352 |
| 8,650,420 B2* | 2/2014 | Kato et al. ................... 713/320 |
| 8,660,869 B2* | 2/2014 | MacIntyre et al. .......... 705/7.11 |
| 8,683,352 B2* | 3/2014 | Scherpa et al. ............... 715/753 |
| 8,689,137 B2* | 4/2014 | McCormack et al. ........ 715/810 |
| 8,707,156 B2* | 4/2014 | Xue et al. ..................... 715/212 |
| 8,713,422 B2* | 4/2014 | Chamberlain et al. ....... 715/217 |
| 8,745,213 B2* | 6/2014 | Dare ........................ G06F 8/60 370/352 |
| 8,812,960 B1* | 8/2014 | Sun .................... H04L 61/6077 705/7.13 |
| 8,832,594 B1* | 9/2014 | Thompson ............ G06F 3/0481 715/256 |
| 8,924,872 B1* | 12/2014 | Bogomolov ................... 379/37 |
| 9,043,894 B1* | 5/2015 | Dennison ............. G06F 21/566 726/11 |
| 9,213,478 B2* | 12/2015 | Kuo ...................... G06F 3/0488 |
| 9,363,148 B2* | 6/2016 | Somaiya ................ H04L 41/22 |
| 2001/0051891 A1* | 12/2001 | Yamamoto et al. ............. 705/9 |
| 2002/0140699 A1* | 10/2002 | Miyadai ....................... 345/440 |
| 2002/0156806 A1* | 10/2002 | Cox et al. ................... 707/501.1 |
| 2003/0052927 A1* | 3/2003 | Barksdale et al. ............ 345/854 |
| 2003/0063134 A1* | 4/2003 | Lord et al. ................... 345/853 |
| 2003/0065986 A1* | 4/2003 | Fraenkel et al. ................ 714/47 |
| 2003/0167278 A1* | 9/2003 | Baudel ........................ 707/102 |
| 2003/0177176 A1* | 9/2003 | Hirschfeld et al. ........... 709/203 |
| 2004/0119713 A1* | 6/2004 | Meyringer ............ G06Q 10/06 345/440 |
| 2004/0174397 A1* | 9/2004 | Cereghini et al. ............ 345/855 |
| 2004/0183800 A1* | 9/2004 | Peterson ..................... 345/440 |
| 2004/0205536 A1* | 10/2004 | Newman et al. ............. 715/509 |
| 2004/0252136 A1* | 12/2004 | Bhatt et al. .................. 345/619 |
| 2005/0177598 A1* | 8/2005 | Hao ...................... G06T 11/206 |
| 2005/0228880 A1* | 10/2005 | Champlin ..................... 709/224 |
| 2005/0240881 A1* | 10/2005 | Rush .................... G06F 3/0482 715/851 |
| 2005/0259962 A1* | 11/2005 | Sano et al. ...................... 386/83 |
| 2005/0262450 A1* | 11/2005 | Sauermann ................... 715/784 |
| 2005/0267835 A1* | 12/2005 | Condron et al. ................ 705/37 |
| 2006/0010418 A1* | 1/2006 | Gupta et al. .................. 717/101 |
| 2006/0044307 A1* | 3/2006 | Song ............................ 345/419 |
| 2006/0074866 A1* | 4/2006 | Chamberlain ........ G06F 17/246 |
| 2006/0164418 A1* | 7/2006 | Hao ...................... G06Q 10/10 345/440 |
| 2006/0206512 A1* | 9/2006 | Hanrahan ........ G06F 17/30554 |
| 2006/0242122 A1* | 10/2006 | DeVorchik et al. .............. 707/3 |
| 2006/0253356 A1* | 11/2006 | Charles et al. ................. 705/35 |
| 2007/0028189 A1* | 2/2007 | Robbins ....................... 715/853 |
| 2007/0126736 A1* | 6/2007 | Tolle et al. ................... 345/440 |
| 2007/0143712 A1* | 6/2007 | Baran .......................... 715/853 |
| 2007/0156565 A1* | 7/2007 | Singer .................... G06Q 40/00 705/37 |
| 2007/0185990 A1* | 8/2007 | Ono et al. .................... 709/224 |
| 2007/0250299 A1* | 10/2007 | Paxson .................. G06F 19/26 703/11 |
| 2008/0028290 A1* | 1/2008 | Suwiryo ....................... 715/227 |
| 2008/0033777 A1* | 2/2008 | Shukoor ......................... 705/8 |
| 2008/0098309 A1* | 4/2008 | Fries et al. .................... 715/734 |
| 2008/0182784 A1* | 7/2008 | Ji et al. .......................... 514/12 |
| 2008/0243550 A1* | 10/2008 | Yao ...................... G06F 19/324 705/3 |
| 2009/0031236 A1* | 1/2009 | Robertson et al. ........... 715/765 |
| 2009/0055762 A1* | 2/2009 | Stiso ........................... 715/764 |
| 2009/0083614 A1* | 3/2009 | Wedekind .................... 715/217 |
| 2009/0119062 A1* | 5/2009 | Owens .................. G06Q 10/10 702/176 |
| 2009/0125825 A1* | 5/2009 | Rye .................... G05B 23/0216 715/764 |
| 2009/0157610 A1* | 6/2009 | Allen, Jr. .......... G06F 17/30991 |
| 2009/0172666 A1* | 7/2009 | Yahalom et al. .................. 718/1 |
| 2009/0237404 A1* | 9/2009 | Cannon, III .................. 345/440 |
| 2009/0244067 A1* | 10/2009 | Pikovsky et al. ............. 345/440 |
| 2009/0248851 A1* | 10/2009 | Pikovsky et al. ............. 709/224 |
| 2009/0249184 A1* | 10/2009 | Dieberger et al. ............ 715/227 |
| 2009/0276771 A1* | 11/2009 | Nickolov et al. ............. 717/177 |
| 2009/0307597 A1* | 12/2009 | Bakman ....................... 715/736 |
| 2010/0070491 A1* | 3/2010 | Cragun et al. ................ 707/722 |
| 2010/0100562 A1* | 4/2010 | Millsap ........................ 707/770 |
| 2010/0144310 A1* | 6/2010 | Bedingfield et al. ......... 455/405 |
| 2010/0169832 A1* | 7/2010 | Chang .......................... 715/811 |
| 2010/0194754 A1* | 8/2010 | Alsbury et al. ............... 345/440 |
| 2010/0214300 A1* | 8/2010 | Alsbury et al. ............ 345/440.2 |
| 2010/0251151 A1* | 9/2010 | Alsbury et al. ............... 715/765 |
| 2010/0257438 A1* | 10/2010 | Becerra et al. ............... 715/204 |
| 2010/0299587 A1* | 11/2010 | Swett .......................... 715/227 |
| 2011/0125803 A1* | 5/2011 | Asahi .......................... 707/797 |
| 2011/0131572 A1* | 6/2011 | Elyashev et al. .................. 718/1 |
| 2011/0173184 A1* | 7/2011 | Kelshikar et al. ............ 707/722 |
| 2011/0213765 A1* | 9/2011 | Cui et al. ..................... 707/711 |
| 2011/0231899 A1* | 9/2011 | Pulier et al. ...................... 726/1 |
| 2011/0261055 A1* | 10/2011 | Wong et al. .................. 345/440 |
| 2011/0283278 A1* | 11/2011 | Murrell et al. ................... 718/1 |
| 2011/0289397 A1* | 11/2011 | Eastmond et al. ............ 715/212 |
| 2012/0015342 A1* | 1/2012 | Baldwin et al. ............... 434/365 |
| 2012/0054332 A1* | 3/2012 | Sahu et al. ................... 709/224 |
| 2012/0102396 A1* | 4/2012 | Arksey .................. G06T 11/206 715/273 |
| 2012/0166967 A1* | 6/2012 | Deimbacher et al. ........ 715/751 |
| 2012/0185776 A1* | 7/2012 | Kirshenbaum et al. ...... 715/735 |

(56) References Cited

U.S. PATENT DOCUMENTS

| | | | |
|---|---|---|---|
| 2012/0198369 A1* | 8/2012 | Sorin et al. | 715/763 |
| 2012/0216135 A1* | 8/2012 | Wong et al. | 715/764 |
| 2012/0272755 A1* | 11/2012 | Ariyoshi | G01N 35/00722 73/866.3 |
| 2012/0278292 A1* | 11/2012 | Zahavi et al. | 707/694 |
| 2012/0284628 A1* | 11/2012 | Wong et al. | 715/736 |
| 2012/0284713 A1* | 11/2012 | Ostermeyer et al. | 718/1 |
| 2012/0311475 A1* | 12/2012 | Wong | 715/772 |
| 2012/0320074 A1* | 12/2012 | Mankovski | G09G 5/00 345/581 |
| 2013/0050217 A1* | 2/2013 | Armitage | 345/440 |
| 2013/0050246 A1* | 2/2013 | Barry et al. | 345/593 |
| 2013/0055058 A1* | 2/2013 | Leong et al. | 715/219 |
| 2013/0055092 A1* | 2/2013 | Cannon et al. | 715/738 |
| 2013/0055146 A1* | 2/2013 | Armitage | G06F 3/0481 715/781 |
| 2013/0055155 A1* | 2/2013 | Wong | G06F 8/65 715/810 |
| 2013/0106906 A1* | 5/2013 | Roche et al. | 345/629 |
| 2013/0117676 A1* | 5/2013 | De Pauw et al. | 715/738 |
| 2013/0144858 A1* | 6/2013 | Lin et al. | 707/709 |
| 2013/0212576 A1* | 8/2013 | Huang et al. | 718/1 |
| 2013/0263119 A1* | 10/2013 | Pissay et al. | 718/1 |
| 2013/0304349 A1* | 11/2013 | Davidson | G08G 1/0112 701/99 |
| 2014/0282163 A1* | 9/2014 | MacKinlay | G06F 17/30 715/769 |
| 2016/0147978 A1* | 5/2016 | Adams | G06Q 50/22 705/2 |

OTHER PUBLICATIONS

Bakman_Fig_A (from Bakman, US PGPUB No. 20090307597 A1), 2009.*

Bakman_Fig_B (from Bakman, US PGPUB No. 20090307597 A1), 2009.*

Cranford, How to Produce Excellent Graphs in SAS, 2009.*

Peltier, Clustered and Stacked Column and Bar Charts, Aug. 1, 2011.*

IBM, Show Barchar in TreeTable, 2006.*

* cited by examiner

MULTI-DIMENSIONAL VISUALIZATION TOOL FOR BROWSING AND TROUBLESHOOTING AT SCALE

BACKGROUND

Computer virtualization is a technique that involves encapsulating a physical computing machine platform into a virtual machine that is executed under the control of virtualization software running on a hardware computing platform (also referred to herein as "host system" or "host computer"). A group of hardware computing platforms may be organized as a cluster to provide the hardware resources for virtual machines. In a data center that employs virtual machines, it is common to see hundreds, even thousands, of virtual machines running on multiple clusters of host systems.

Cloud computing refers to distributed allocation of computing resources via a computer network rather than from a single local computer. A "cloud" can include one or more host computers that can be arranged as clusters of host computers. In addition, host computers and clusters of host computer can be arranged in a data center, and multiple data centers can be arranged as "virtual centers."

Navigating a large inventory of objects (e.g., virtual centers, data centers, host computers, virtual machines, and/or data storage for the virtual machines) in the virtual computing environment poses numerous usability challenges. Typically, the inventory is displayed as an "inventory tree," where objects in the virtual computing environment are arranged according to their hierarchy. FIG. 3 is a conceptual diagram of a user interface for navigating an inventory of objects, according to the prior art. As shown, objects are displayed in a panel (shown on the left side of the interface) according to the object hierarchy. However, using an inventory tree to display the inventory of objects has significant drawbacks. In large environments of tens of thousands of objects, the inventory tree does not provide a complete picture of the entire environment due to limited screen size. Similarly, when any single branch of the tree has a large number of objects, only a part of the branch can be shown on the screen at any point in time. Another limitation is that the inventory tree is constructed along a single dimension, meaning that each object has at most one parent. In addition, because of the limited screen space for displaying metadata in the inventory tree, each object is associated with, at most, a few icons or "badges" that indicate that additional information about the object is available.

SUMMARY

Embodiments of the invention provide a user interface that allows administrators of a virtualized computing environment to easily navigate to and/or search for specific objects, determine relationships between selected objects, and have visibility into the health status of objects in the virtualized computing environment. Objects within a column may be displayed with names, displayed as bars, or aggregated into groups based on the number of objects in the column. Also, in some embodiments, when a user selects one object, objects in other columns that are related to the selected object may be visually distinguished from the other objects, allowing an administrator to easily navigate to related objects.

One embodiment of the invention provides a method for displaying a graphical user interface (GUI) for a computing environment. The method includes displaying a column of objects included in the computing environment, wherein: if all of the objects can be displayed with names in the GUI, then displaying the objects with names; if all of the objects cannot be displayed with names in the GUI and all of the objects can be displayed in the GUI as bars, then displaying each objects as a bar; if all of the objects cannot be displayed with names in the GUI and all of the objects cannot be displayed as bars in the GUI, then: aggregating the objects into groups; displaying the groups of objects in the GUI; and sorting the objects or the groups of objects in the GUI based on health status.

Another embodiment of the invention provides a method for displaying a graphical user interface (GUI) for a computing environment. The method includes displaying a plurality of objects organized into a plurality of columns; receiving a selection of a first object included in a first column; displaying a first set of objects related to the first object in a distinguishing manner from other objects not included in the first set of objects; receiving a selection of a second object included in the first set of objects; and displaying a subset of objects included in the first set of objects in a distinguishing manner from other objects not included in the subset of objects, wherein objects included in the subset of object are related to the first object and the second object.

DETAILED DESCRIPTION

Figure 1A:
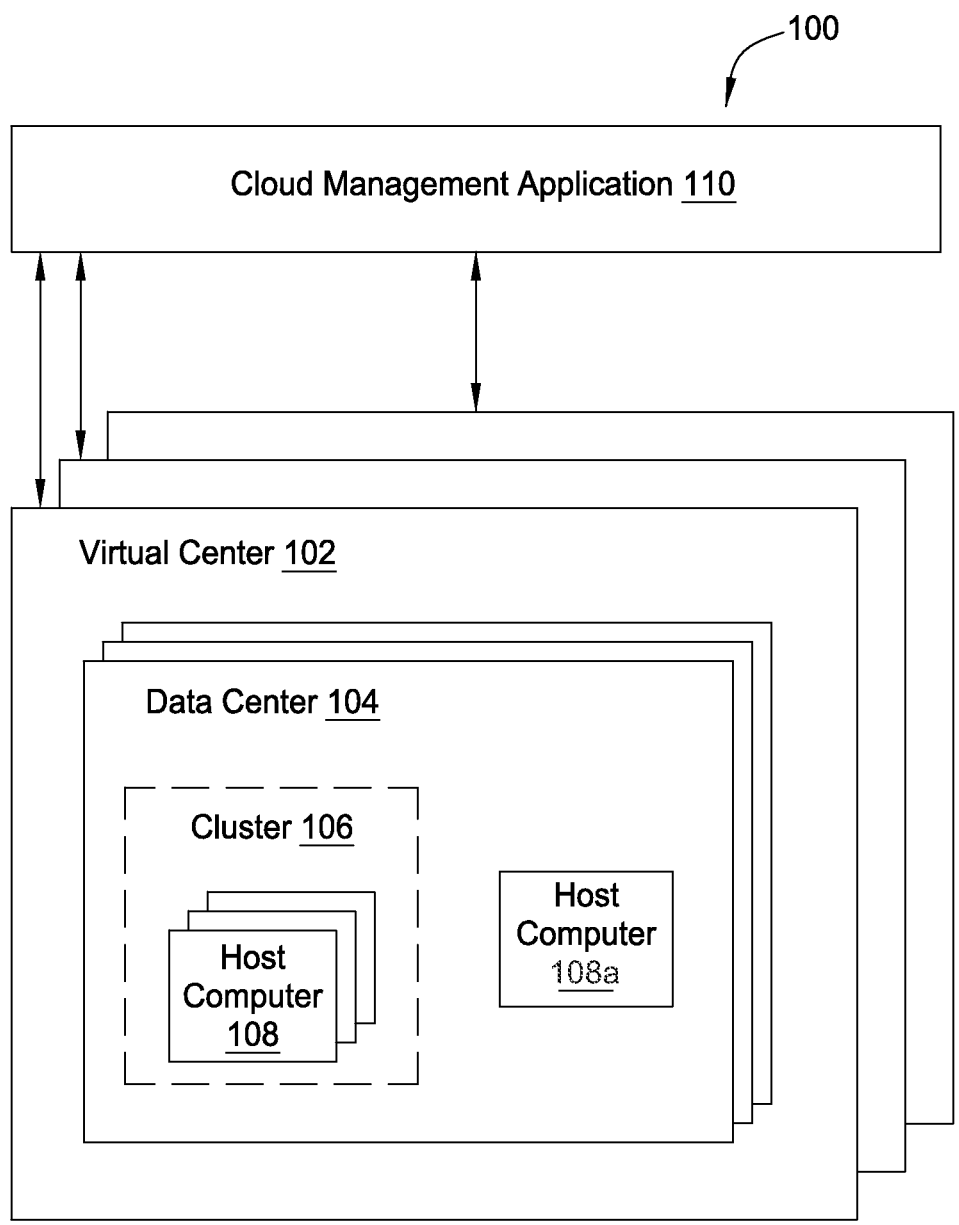
FIG. 1A depicts a block diagram of a virtualized computer system in which one or more embodiments of the present invention may be practiced.

FIG. 1A depicts a block diagram of a virtualized computer system 100 in which one or more embodiments of the present invention may be practiced. The computer system 100, which may include one or more virtual centers 102 and a cloud management application 110, in some cases, is referred to as "the cloud." Host computers 108 (also referred to herein as "servers") are configured to deliver virtualization-based distributed services to information technology environments. Each host computer 108 provides a virtualization layer that abstracts processor, memory, storage, and/or networking resources into multiple virtual machines that run on the same physical host computer 108. In one embodiment, virtualization software is installed directly on the server hardware and inserts a virtualization layer between the hardware and the operating system. The virtualization software partitions a physical host computer 108 into multiple secure and portable virtual machines that run on the same physical server. Each virtual machine represents a complete system—with processors, memory, networking, storage, and/or BIOS.

Host computers 108 are organized into a cluster 106. One or more clusters 106 and host computers 108a are organized into a data center 104. One or more data centers 104 are organized into a virtual center 102. One or more virtual centers are organized into the virtualized computer system 100, also referred to as "the cloud." The one or more virtual centers 102, and ultimately the host computers 108 and 108a included therein, are managed via a cloud management application 110. The cloud management application 110 manages the virtual infrastructure, including managing the host computers 108 and 108a, the virtual machines running within each host computer 108 and 108a, provisioning, migration, resource allocations, and so on.

In some embodiments, the cloud management application 110 is a management tool used administrators to manage their virtual infrastructure. The cloud management application 110 has an object-based user interface model, where many of the operations provided by the cloud management application 110 are object-centric. Examples of operations that are provided by the cloud management application 110 include, selecting or navigating to an object, viewing an object's relationships or position in the virtual infrastructure hierarchy, and determining a state of the object.

The management operations of the cloud management application 110 can be performed via a client application (not shown). For example, each configuration task, such as configuring storage and network connections or managing the service console, can be accomplished centrally through the client application. In another example, an administrator can access the cloud management application 110 to troubleshoot one or more of the virtual centers 102, data centers 104, clusters 106, host computers 108, and/or virtual machines. One embodiment provides a stand-alone application version of the client application. In another embodiment, the client application is implemented as a web browser application that provides management access from any networked device.

According to some embodiments, administrators can access the cloud management application 110 to troubleshoot objects in the virtual computing environment. As described in greater detail herein, embodiments of the invention provide a user interface for displaying a large inventory of objects in single screen and allow the administrator to quickly determine where problems exist and navigate to the relevant objects.

Figure 1B:
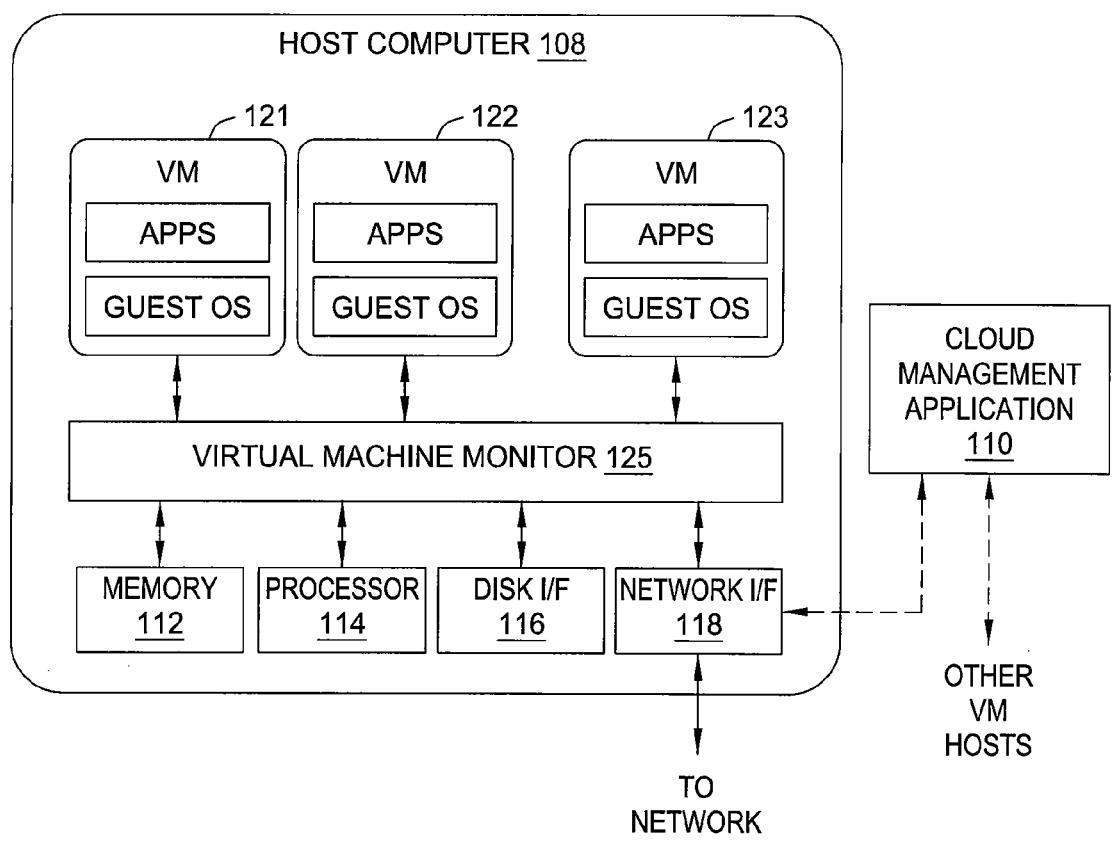
FIG. 1B depicts a block diagram of a host computer and cloud management center, according to one embodiment of the invention.

FIG. 1B depicts a block diagram of a host computer 108 and cloud management application 110, according to one embodiment of the invention. A virtualized environment includes a host computer 108 that has conventional components of a computing device, and may be implemented within a cluster 106 of computing devices, as shown in FIG. 1A. One or more virtual machines are configured within the host computer 108, represented in FIG. 1B as VM 121, VM 122, and VM 123, that share hardware resources of host computer 108, such as system memory 112, processor 114, disk interface 116, and network interface 118. Examples of disk interface 116 are a host bus adapter and a network file system interface. An example of network interface 118 is a network adapter, also referred to as a Network Interface Card (NIC). In some embodiments, a plurality of NICs is included in the network interface 118. The cloud management application may be coupled to the network interface 118 via a virtual center 102 server, which is coupled to a host computer 108, such an ESX host computer.

The virtual machines VM 121-123 run on top of a virtual machine monitor 125, which is a software interface layer that enables sharing of the hardware resources of host computer 108 by the virtual machines. Virtual machine monitor 125 may run on top of the operating system of the host computer 108 or directly on hardware components of the host computer 108. In some embodiments, virtual machine monitor 125 runs on top of a hypervisor that is installed on top of the hardware resources of host computer 108. Together, the virtual machines 121-123 and virtual machine monitor 125 create virtualized computer systems that give the appearance of being distinct from host computer 108 and from each other. Each virtual machine includes a guest operating system and one or more guest applications. The guest operating system is a master control program of the virtual machine and, among other things, the guest operating system forms a software platform on top of which the guest applications run.

In one embodiment, data storage for host computer 108 is served by a storage area network (SAN) (not shown), which includes a storage array (e.g., a disk array) and a switch (SAN fabric) that connects host computer 108 to storage array via the disk interface 116. In virtualized computer systems, in which disk images of virtual machines are stored in the storage arrays, disk images of virtual machines can be migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it. In other embodiments, any technically feasible data storage implementation, other than a SAN, can be used to provide storage resources for host computer 104.

Figure 2:
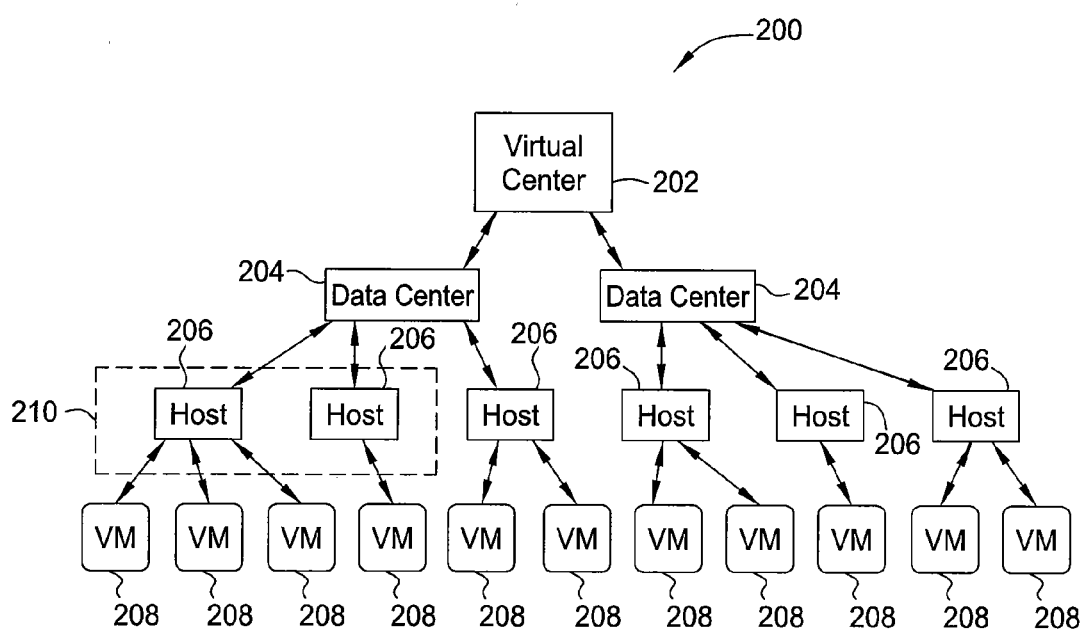
FIG. 2 depicts a hierarchical organization of a virtualized computing environment, according to one embodiment of the invention.
Figure 3:
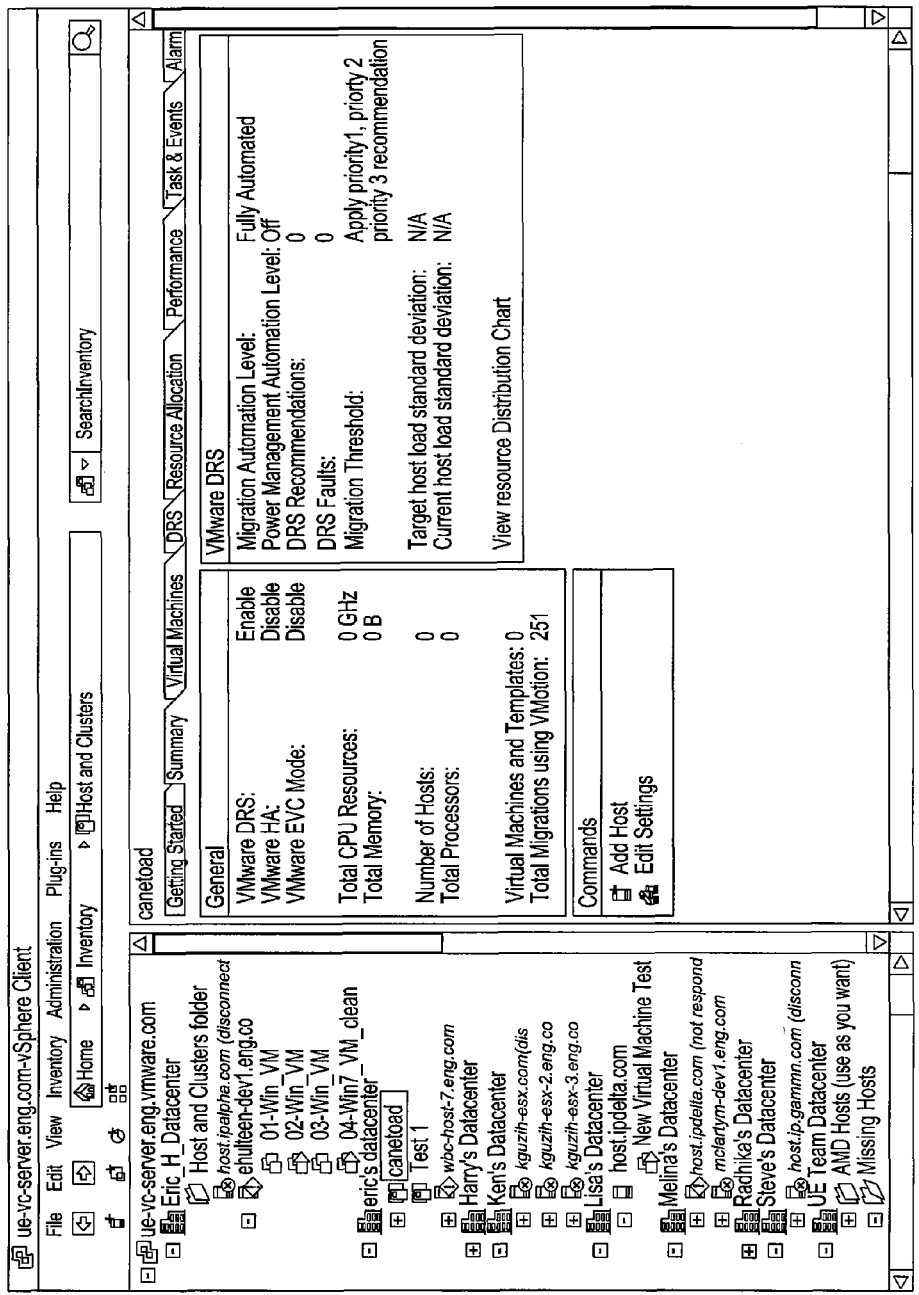
FIG. 3 is a conceptual diagram of a user interface for navigating an inventory of objects, according to the prior art.

FIG. 2 depicts a hierarchical organization of a virtualized computing environment 200, according to one embodiment of the invention. As shown, a virtual center 202 is at the root of the hierarchy. The virtual center 202 includes one or more data centers 204. Each data center 204 includes one or more host computers 206. A set of host computers 206 are also organized as a cluster 210. Each host computer 206 runs one or more virtual machines (VMs) 208. As described in greater detail herein, embodiments of the invention provide a user interface for visualizing, navigating, and troubleshooting the objects in the virtual computing environment 200.

Figure 4A:
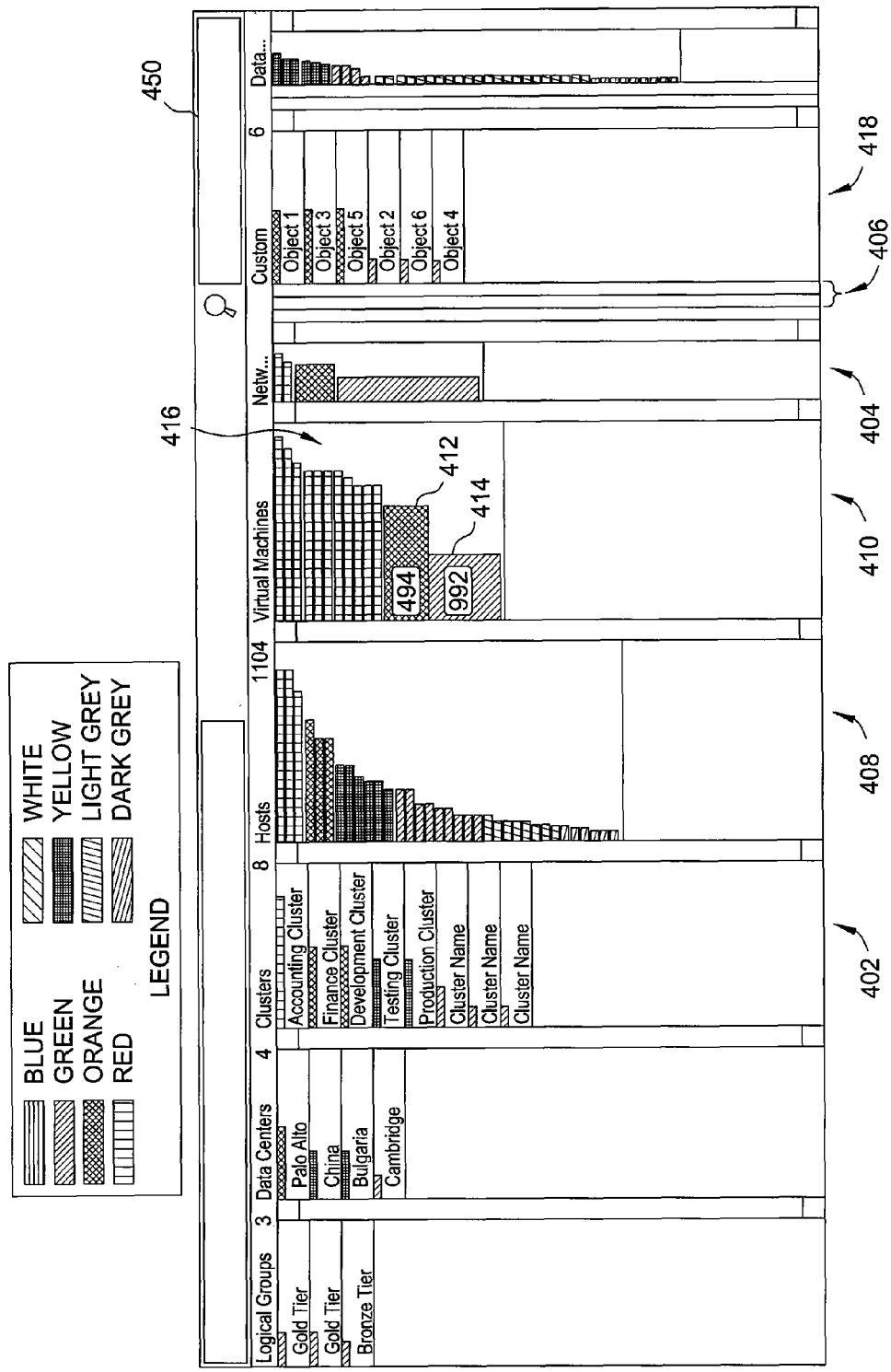
FIGS. 4A-4C are conceptual diagrams illustrating a user interface for managing objects in a virtualized computing environment, according to various embodiments of the invention.
Figure 4B:
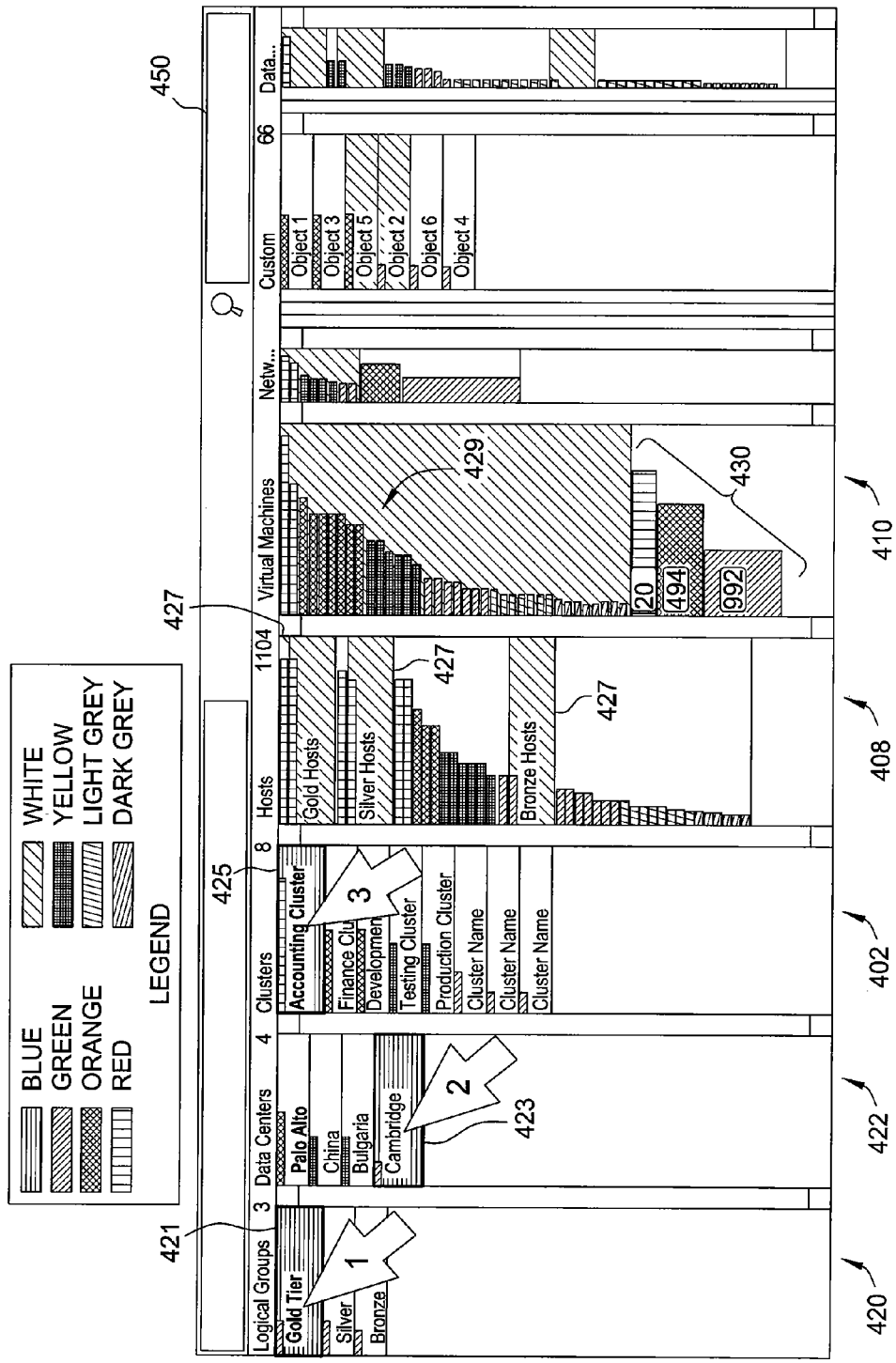
Figure 4C:
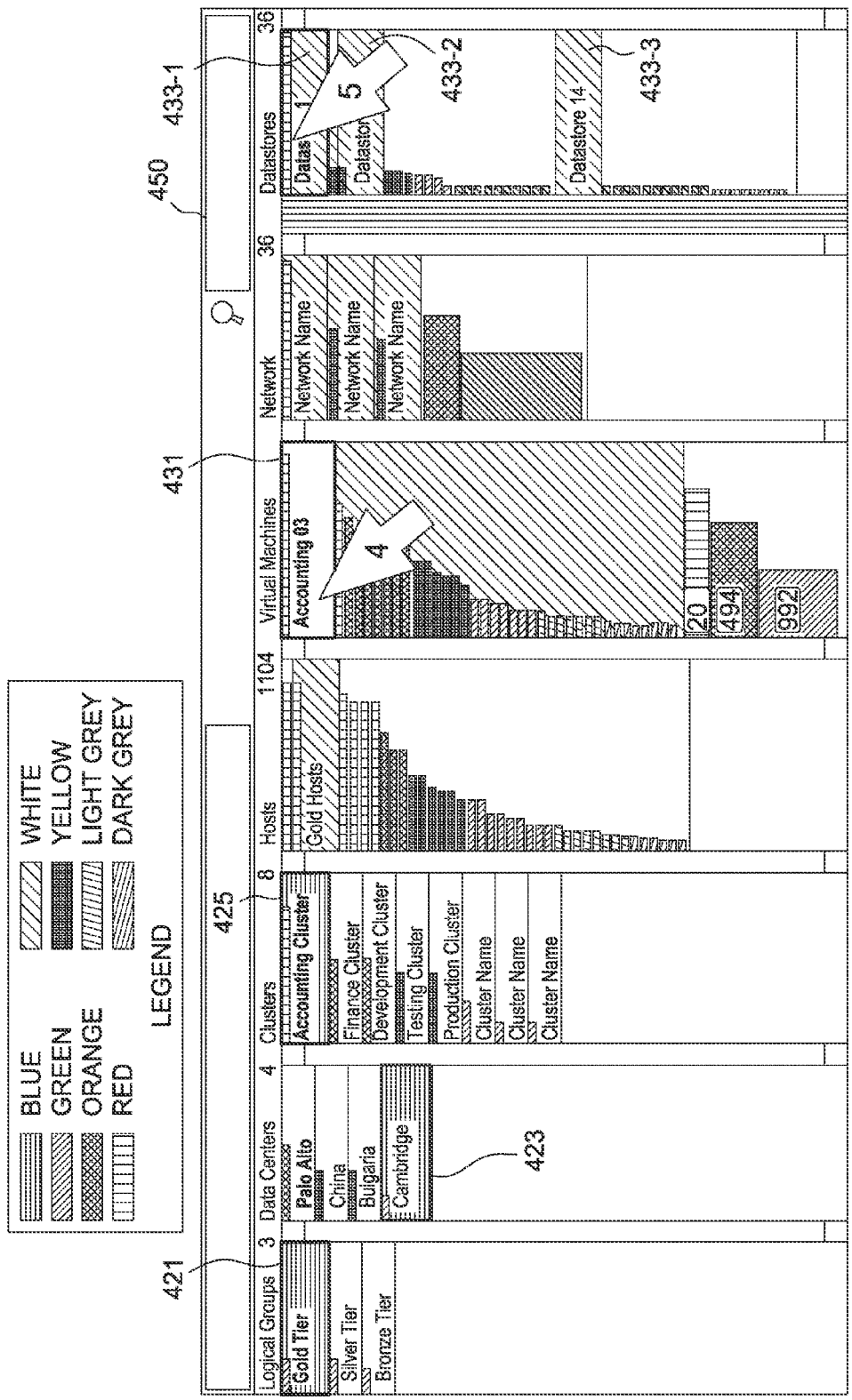

FIGS. 4A-4C are conceptual diagrams illustrating a user interface for managing objects in a virtualized computing environment, according to various embodiments of the invention. As shown in FIG. 4A, columns in the user interface represent an object type or view, and each cell within a column represents either an object or an aggregation of objects. In one embodiment, there is no strict hierarchical relationship between columns. However, in some embodiments, the object types that typically represent parent objects are positioned to the left of their children object types. This means that from left to right, the columns loosely correspond to the known inventory hierarchy. Using a user interface that has a "loose" left-to-right correlation allows a user to search for and filter down on object types from left-to-right, which is more likely to match the reading order that the user would use when selecting objects.

However, left-to-right hierarchical arrangement is not a requirement of some embodiments because some embodiments combine object types together into a single user interface, and there is no single tree definition. For example, networking information, which can be included in one column of the user interface, is not hierarchically related to the hosts and clusters hierarchy of objects.

One feature of embodiments of the invention is that columns that may be considered more important are viewed in full width, columns that may be considered less important are viewed in reduced width, and the least important columns are collapsed. For example, a clusters column 402 is expanded to full width so that all of the names of the objects within the column 402 are fully visible. Networking column 404, which in some examples may be deemed less important than the clusters column 402, is displayed with reduced width. Also, columns 406 are shown as being fully collapsed. In one embodiment, a cloud management application configured to generate the user interface shown in FIG. 4A may be configured with default parameters that indicate which columns are deemed important, which columns are deemed less important, and which columns are deemed least important. These default values can be changed by an administrator. In some embodiment, each of the columns, regardless of its default state, can be expanded to its full width if so desired by the user. By allowing varying sizes of columns and enabling collapsed columns, embodiments allow more columns to fit within the user interface than prior approaches. For example, embodiments support a larger set of views as compared to a traditional inventory tree that represents only one of several views.

Another feature of embodiments of the invention is that the objects included in a particular column can be displayed differently depending on the number of objects within the column. If the number of object is small enough so that all of the objects in the column can be displayed with enough room (vertically) for the names of all the objects to be visible (i.e., without scrolling), then the objects in the column are displayed with names and "bars" that correspond to a metric related to the objects. For example, there is enough room vertically in column 402 to display all of the clusters with the names of each cluster that are displayed with the bar. The bar is described in greater detail below.

However, if the number of objects is large enough so that all of the objects in the column cannot be displayed with enough room (vertically) for the names of all of the objects, then the objects in the column may be displayed as bars. For example, a hosts column 408 includes enough objects such that if the names of all of the objects in the hosts column 408 were displayed, there would not be enough room (vertically) in the user interface to display all of the names without requiring the user to scroll down within the column to view the remaining objects. Therefore, embodiments of the invention remove the names from the cells corresponding to the objects and display only the bars.

Still further, if the number of object is so large that all of the objects in the column cannot be displayed with enough room (vertically) using just bars, then the objects in the column are aggregated into groups. For example, virtual machines column 410 includes many objects. If each object within the virtual machines column 410 were displayed as a bar, then there would not be enough room (vertically) in the user interface to display all of the bars without requiring the user to scroll down within the column to view the remaining objects. As shown, some of the objects in the virtual machines column 410 are aggregated into groups 412 and 414. In one embodiment, the objects are aggregated according to their respective status in view a of a given metric. For example, the bars may represent the health of an object, where objects that are in "good" health are aggregated into group 414, objects that are in "medium" health are aggregated in group 412, and objects that are in poor health are not aggregated 416. In one embodiment, none of the objects in poor health is aggregated and each object in poor health is displayed separately. This allows administrators to have ease of access to the objects in poor health. However, in some embodiments, when the number of objects that are in poor health is large, the objects in poor health can be aggregated into a group similar to the objects in the other groups 412, 414. In some embodiments, each group of aggregated objects includes a count that indicates the number of objects included in the group. In some embodiments, when an administrator selects a group of aggregated objects (e.g., by clicking) the group of objects is expanded to display each object separately. In some embodiments, a group of object can be expanded when the group is "moused-over" by a mouse pointer.

Another feature of embodiments of the invention is the use of "bars," as mentioned above. For each object, the bar corresponds to a metric value associated with a given metric. In one example, each object can be associated with a health value that corresponds to computing resources available or used by the object. The health value may be a derived metric indicating whether the object performs "as expected" with respect to an ideal condition and/or performance expectation, where the health value is tied to, for example, resources available or used by the object. In one example, the bar may correspond to an inverse health of the object, where a longer bar indicates worse health. For example, a host with very few memory resources available may be considered to be in poor health; whereas, a host with a large amount of memory resources available may be considered to be in good health. In one example, the bar comprises a health bar and a health value of the object can be represented by the length of the health. As described in the example above, the longer the bar, the worse the health of the object. In other examples, the bar may represent any other technically feasible metric, such as, for example, utilization, performance, and/or age of the object.

In one example, health of an object can be represented by a horizontal bar in a cell associated with the object. In one embodiment, the longer the bar, the less healthy the object. In some cases, embodiments want to attract attention to the unhealthiest of objects so that the administrator can take action to correct the issue. Also, the health bars can be color coded to assist administrators in locating unhealthy objects. However, since length is also used to distinguish the health among objects, the position of the end of the bar can imply health, meaning that even color-blind users can interpret the health values without relying on viewing the different colors of the health bar. In one embodiment, the objects within a column are sorted by the health status such that the most unhealthy objects are at the top of the column. Again, as described above, embodiments of the invention are not limited to health bars, and bars corresponding to any other metric are also within the scope of various embodiments.

Another feature of embodiments of the invention is that users can define custom columns, such as custom column 418. Customized parameters can be used to assess the health of the objects included in the custom column 418.

As described in greater detail below, another feature of embodiments of the invention is that when a user selects an object (e.g., by clicking on the object), the user interface is updated to highlight the other objects that are related to the selected object. For example, when an object is selected, all related objects to the selected object expand and/or become highlighted in their respective columns. For example, when a cluster in one column is selected, any hosts inside the cluster are expanded in the host column. Similarly, any VMs inside the expanded hosts are expanded in the VM column.

In some embodiments, a user can select a first object in one column and select a second object in another column. In some embodiments, only objects that are associated with both the first object and the second object are expanded and/or highlighted. Displaying related objects in this manner makes browsing and navigating very easy and enables the user to browse both parent objects and child objects equally quickly.

As shown in the example in FIG. 4B, a user has selected a "Gold Tier" object 421 from a logical groups column 420, a "Cambridge" object 423 from a data centers column 422, and an "Accounting Cluster" object 425 from a clusters column 402. The selected objects 421, 423, 425 can be displayed in a distinguishing color, such as blue. As also shown in FIG. 4B, other objects that are related to the all of the three selected objects 421, 423, 425 is also displayed in a distinguishing color, such as white. Within the hosts column 408, three objects 427 are displayed as being related to the selected objects 421, 423, 425.

In some embodiments, objects that are related to the selected objects 421, 423, 425 can be removed or "deaggregated" from the groups of aggregated objects. As shown in the virtual machines column 410, a set of objects 429 has been removed from the groups 430 of aggregated objects and are shown with a distinguishing background color indicating that each object in the set of objects 429 is related to the selected objects 421, 423, 425. The remaining objects are re-aggregated into groups 430. The count of each group is updated to reflect the removal of some of the objects from the groups.

In one example, there may be some objects included in the set of objects 429 that have poor health, and the administrator may wish to improve the health of those objects, which would improve the health of the related clusters object 425.

Continuing with this example, as shown in FIG. 4C, object 431 is selected by the administrator. Since object 431 has a poor health status, the administrator may want to troubleshoot the situation by determining which objects in the virtualized computing environment are related to object 431 and possibly make some changes the virtualized computing environment and/or object 431. In the example shown in FIG. 4C, four different objects are selected, namely objects 421, 423, 425, and 431. After the administrator selects object 431, the user interface is updated to show objects that are related to all of objects 421, 423, 425, and 431 with a distinguishing background color. More specifically, several datastore objects 433-1, 433-2, 433-3 included in datastore column 432 are indicated as being related to the selected objects 421, 423, 425, and 431. From this user interface, the user can quickly identify that one of the data store objects (i.e., datastore object 433-1) has a poor health status and may be contributing the poor health status of object 431. The administrator can then select object 433-1 and do further investigation and/or make changes to object 433-1.

Another feature of embodiments of the invention is that a search field 450 may be included in the user interface that allows the user to search for objects by keyword. For example, a user may type a keyword in the search field 450, and the cloud management application searches the columns of objects to identify items associated with the keyword. In one embodiment, all of the columns are searched. In other embodiments, a subset of the columns are searched. The identified objects may be expanded to full view. The user can then select one of the expanded objects, which causes other objects that are related to the selected object to be expanded or highlighted, as described above.

Yet another feature of embodiments of the invention is a summary status bar included in the user interface. A summary status bar may be displayed anywhere in the user interface (e.g., at the top of the user interface) and includes a summary of the status of a subset of the columns in the user interface. For example, the five most important columns may be selected and a status summary of each of the five columns is displayed in the summary status bar. In one embodiment, the summary status bar is always included in the user interface. In other embodiments, the summary status bar may be hidden. The choice of which columns are included in the summary status bar may be configurable. If the user selects one of the columns included in the summary status bar, the selected column expands in the user interface, as described above. In one example workflow, the summary status bar may attract the user's attention to issues in the virtualized computing environment and allows the user to quickly to expand down to the relevant column of objects. Selecting a particular object within the expanded column causes relevant objects in other columns to be expanded and/or highlighted, as described above, to allow for further troubleshooting.

Figure 5:
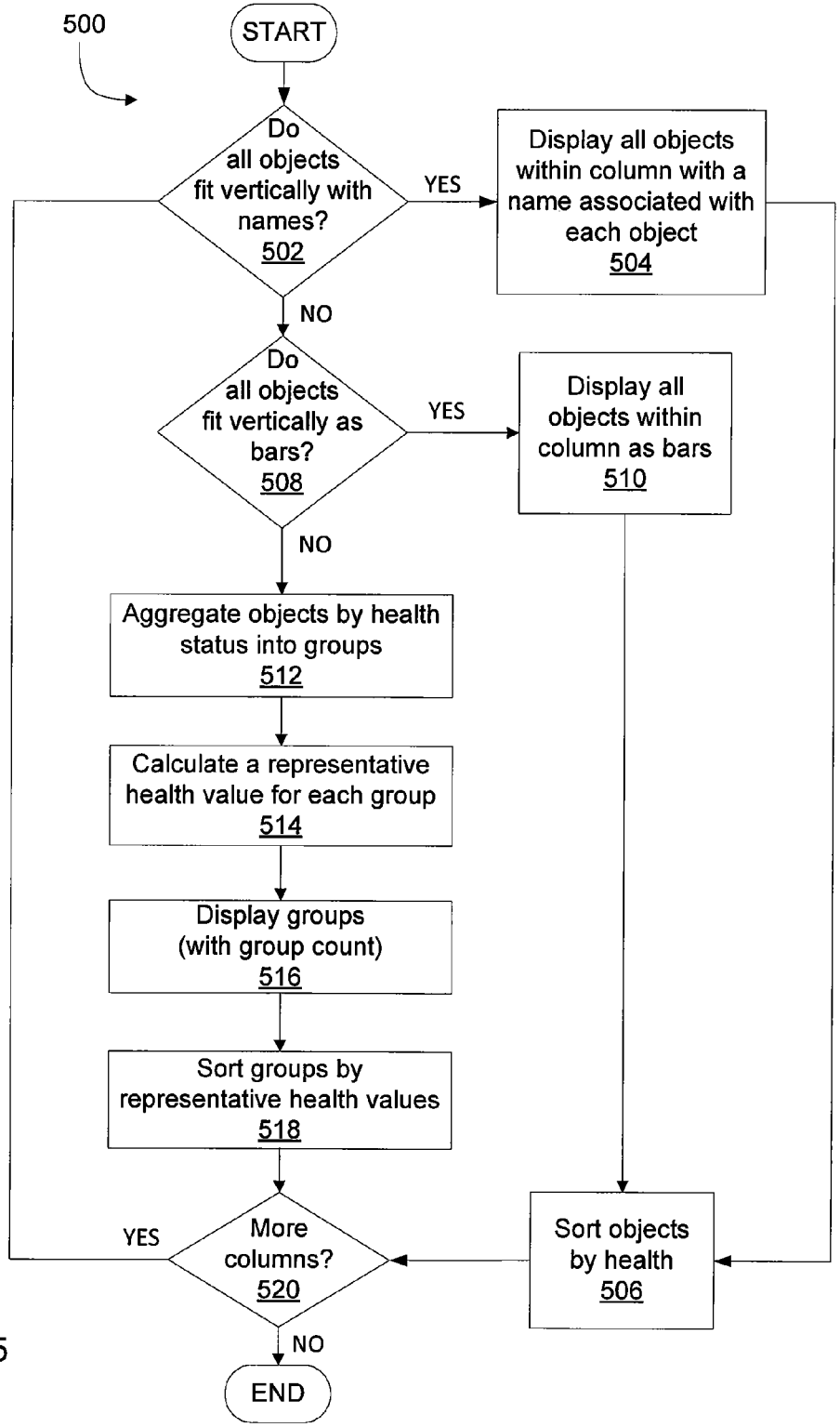
FIG. 5 is a flow diagram displaying objects within columns, according one embodiment of the invention.

FIG. 5 is a flow diagram displaying objects within columns, according one embodiment of the invention. Persons skilled in the art would understand that, even though the method 500 is described in conjunction with the systems of FIGS. 1A-4C, any system configured to perform the method steps, in any order, is within the scope of embodiments of the invention.

As shown, the method 500 begins at step 502, where a cloud management application, such as cloud management application 110, executed by a processor determines whether, for a particular column of objects, all of the objects within the column fit vertically in the user interface with names. If the cloud management application determines that all of the objects within the column do fit vertically in the user interface with names, then the method 500 proceeds to step 504, where the cloud management application displays all of the objects within the column with a name associated with each object. At step 506, the cloud management application sorts the objects in the column based on health status. As described, each object can be associated with a health value corresponding to the usage and/or availability of one or more computing resources. In one example, the objects can be sorted based on health status, where objects with poor health status are listed towards the top of the user interface compared to objects with good health status. The method 500 then proceeds to step 520, described below.

Referring back to step 502, if the cloud management application determines that not all of the objects fit vertically within the column in the user interface with names, then the method 500 proceeds to step 508, where the cloud management application determines whether all of the objects fit vertically within the column in the user interface displayed as bars. If the cloud management application determines that all of the objects do fit vertically within the column in the user interface displayed as bars, then the method 500 proceeds to step 510, where the cloud management application displays all of the objects within the column as bars. The method 500 then proceeds to step 506, described above, where the objects are sorted based on health status.

Referring back to step 508, if the cloud management application determines that not all of the objects fit vertically within the column as bars, then the method 500 proceeds to step 512. At step 512, the cloud management application aggregates objects by health status into two or more groups. Each group may be associated with an upper and lower threshold, where objects that fall within the threshold are included in the group.

At step 514, the cloud management application calculates a representative health value for each group. In some embodiments, calculating the representative health value for a group may include taking a mathematical mean of the health values of the objects in the group. At step 516, the cloud management application displays the aggregated groups of objects. In some embodiments, a count is also displayed in association with a group indicating the number of objects included the group. At step 518, the groups are sorted based on the representative health values of the groups.

At step 520, the cloud management application determines whether any additional columns are left to be processed. If the cloud management application determines that no additional columns are left to be processed, then the method 500 terminates. If the cloud management application determines that there are additional columns left to be processed, then the method 500 returns to step 502, described above.

Figure 6:
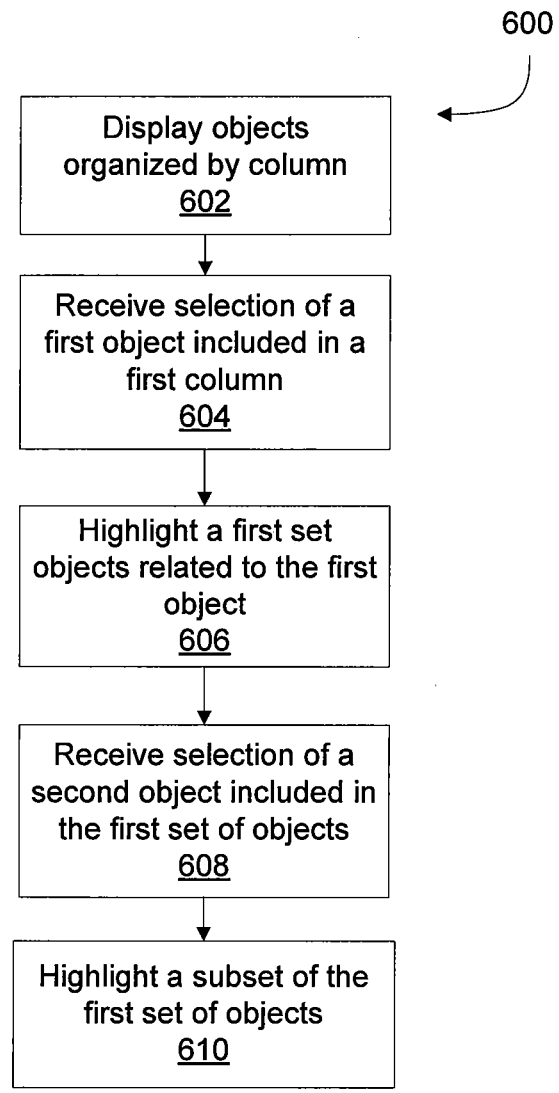
FIG. 6 is a flow diagram for selecting an object included in virtualized computing environment, according to one embodiment of the invention.

FIG. 6 is a flow diagram for selecting an object included in virtualized computing environment, according to one embodiment of the invention. Persons skilled in the art would understand that, even though the method 600 is described in conjunction with the systems of FIGS. 1A-4C, any system configured to perform the method steps, in any order, is within the scope of embodiments of the invention.

As shown, the method 600 begins at step 602, where the cloud management application displays objects organized by column. In one embodiment, the columns are displayed based on the technique described in FIG. 5. At step 604, the cloud management application receives a selection of a first object included in a first column.

At step 606, the cloud management application highlights a first set of objects that are related to the first object. As described in FIGS. 4B-4C, some of the objects included in the first set of objects may be de-aggregated from a group of objects and displayed individually. Also, in some embodiments, one or more columns of the user interface may narrow, may widen, or may collapse based on which objects are included in the first set of objects. For example, if a particular column does not include any objects in the first set of objects, the column may be narrowed or collapsed.

At step 608, the cloud management application receives a selection of a second object included in the first set of objects. At step 610, the cloud management application highlights a subset of objects from the first set of objects that are related to the first object and the second object. In this manner, for each object that is selected in the user interface, the cloud management application is configured to update the user interface to filter out only those objects that are related to each of the selected objects.

In sum, embodiments of the invention provide a user interface that allows administrators of a virtualized computing environment to easily navigate to and/or search for specific objects, determine relationships between selected objects, and have visibility into the health status of objects in the virtualized computing environment. Objects within a column may be displayed with names, displayed as bars, or aggregated into groups based on the number of objects in the column. Also, in some embodiments, when a user selects one object, objects in other columns that are related to the selected object may be visually distinguished from the other objects, allowing an administrator to easily navigate to related objects.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for displaying a graphical user interface (GUI) for a computing environment, the method comprising:
   displaying objects associated with a same hierarchy in the computing environment in each of a plurality of columns of the GUI dynamically based on a number of the objects in the column by carrying out, with respect to each of the columns:
      displaying each of the objects in the column with a name in response to a determination that all of the objects can be displayed with names within a vertical space of the column;
      displaying each of the objects in the column as a bar in response to a determination that all of the objects cannot be displayed with names in the vertical space of the column but can be displayed as bars in the vertical space of the column; and
      in response to a determination that all of the objects cannot be displayed with names in the vertical space of the column and all of the objects cannot be displayed as bars in the vertical space of the column, then:
         aggregating the objects in the column into groups; and
         displaying the groups of objects in the vertical space of the column;
   sorting the objects or the groups of objects in each of the columns of the GUI,
   wherein the objects in the columns include a plurality of hierarchically related computing resources for executing virtual machines;
   detecting that a user has selected one of the objects in one of the columns; and
   in response to the detecting, highlighting the selected object and objects that are hierarchically related to the selected object and displayed in columns different from said one of the columns.

2. The method of claim 1, wherein the objects or the groups of objects in each of the columns are sorted based on health status, such that the objects or the groups of objects with lower health status are displayed above the objects or the groups of objects with higher health status.

3. The method of claim 2, wherein the health status of an object is based on the consumption of computing resources by the object.

4. The method of claim 1, further comprising displaying at least one column that is not associated with a hierarchical arrangement of objects in the computing environment.

5. The method of claim 1, wherein aggregating the objects into groups is based on health status of the objects.

6. The method of claim 1, wherein a width of the column is based on a relative importance of the column to at least one other column.

7. The method of claim 1, wherein each object is displayed as a bar, wherein the length of each bar is based on health status of the object.

8. The method of claim 1, wherein:
   the plurality of hierarchically related computing resources includes one or more virtual machines, one or more hosts that execute the one or more virtual machines, one or more clusters that include groupings of hosts, one or more data centers that include the clusters, and one or more logical groupings of data centers.

9. The method of claim 1, wherein the selected object comprises a cluster and the other objects comprise hosts that are included in the cluster.

10. The method of claim 1, further comprising de-aggregating objects that are hierarchically related to the selected object and displayed in columns different from said one of the columns from a group that includes the objects that are hierarchically related to the selected object.

11. A method for displaying a graphical user interface (GUI) for a computing environment, the method comprising:
   displaying a plurality of objects organized into a plurality of columns tiled left-to-right in the GUI, where, in each of the plurality of columns, all objects in the column are displayed dynamically with names in response to a determination that said all objects can be displayed with names within a vertical space of the column, and displayed dynamically as a bar in response to a determination that said all objects cannot be displayed with names within the vertical space of the column but can be displayed as bars;
   in response to a determination that all of the objects cannot be displayed with names in the vertical space of the column and all of the objects cannot be displayed as bars in the vertical space of the column, then:
      aggregating the objects in the column into groups; and
      displaying the groups of objects in the vertical space of the column;
   receiving a selection of a first object included in a first column;
   displaying, in at least one column other than the first column, a first set of objects related to the first object in a distinguishing manner from other objects not included in the first set of objects;
   receiving a selection of a second object included in a second column;
   displaying, in at least one column other than the first and second columns, a subset of objects included in the first set of objects in a distinguishing manner from other objects not included in the subset of objects, wherein objects included in the subset of object are related to the first object and the second object, wherein the objects in the columns include a plurality of hierarchically related computing resources for executing virtual machines;

detecting that a user has selected one of the objects in one of the columns; and in response to the detecting, highlighting the selected object and objects that are hierarchically related to the selected object and displayed in columns different from said one of the columns.

12. The method of claim 11, wherein another column is widened or narrowed based on receiving the selection of the first object included in the first column.

13. The method of claim 11, wherein another column is collapsed based on receiving the selection of the first object included in the first column.

14. The method of claim 11, wherein displaying the subset of objects comprises:

removing one or more objects from a group of objects; and displaying the one or more objects in the distinguishing manner from other objects not included in the subset of objects.

15. A non-transitory computer-readable storage medium comprising instructions that, when executed in a computing device, provide for displaying a graphical user interface (GUI) for a computing environment, by performing the steps of:

displaying objects associated with a same hierarchy in the computing environment in each of a plurality of columns of the GUI dynamically based on a number of the objects in the column by carrying out, with respect to each of the columns:

displaying each of the objects in the column with a name in response to a determination that all of the objects can be displayed with names within a vertical space of the column;

displaying each of the objects in the column as a bar in response to a determination that all of the objects cannot be displayed with names in the vertical space of the column but can be displayed as bars in the vertical space of the column; and in response to a determination that all of the objects cannot be displayed with names in the vertical space of the column and all of the objects cannot be displayed as bars in the vertical space of the column, then:

aggregating the objects in the column into groups; and displaying the groups of objects in the vertical space of the column;

sorting the objects or the groups of objects in each of the columns of the GUI, wherein the objects include a plurality of hierarchically related computing resources for executing virtual machines;

detecting that a user has selected one of the objects in one of the columns; and in response to the detecting, highlighting the selected object and objects that are hierarchically related to the selected object and displayed in columns different from said one of the columns.

16. The computer-readable storage medium of claim 15, wherein the objects or the groups of objects in each of the columns are sorted based on health status, such that the objects or the groups of objects with lower health status are displayed above the objects or the groups of objects with higher health status.

17. The computer-readable storage medium of claim 16, wherein the health status of an object is based on the consumption of computing resources by the object.

18. The computer-readable storage medium of claim 15, wherein the steps further comprises displaying at least one column that is not associated with a hierarchical arrangement of objects in the computing environment.

19. The computer-readable storage medium of claim 15, wherein aggregating the objects into groups is based on health status of the objects.

20. The computer-readable storage medium of claim 15, wherein a width of the column is based on a relative importance of the column to at least one other column.

21. The computer-readable storage medium of claim 15, wherein each object is displayed as a bar, wherein the length of each bar is based on health status of the object.

22. A non-transitory computer-readable storage medium comprising instructions that, when executed in a computing device, provide for displaying a graphical user interface (GUI) for a computing environment, by performing the steps of:

displaying a plurality of objects organized into a plurality of columns tiled left-to-right in the GUI, where, in each of the plurality of columns, all objects in the column are displayed dynamically with names in response to a determination that said all objects can be displayed with names within a vertical space of the column, and displayed dynamically as a bar in response to a determination that said all objects cannot be displayed with names within the vertical space of the column but can be displayed as bars;

in response to a determination that all of the objects cannot be displayed with names in the vertical space of the column and all of the objects cannot be displayed as bars in the vertical space of the column, then:

aggregating the objects in the column into groups; and displaying the groups of objects in the vertical space of the column;

receiving a selection of a first object included in a first column;

displaying, in at least one column other than the first column, a first set of objects related to the first object in a distinguishing manner from other objects not included in the first set of objects;

receiving a selection of a second object included in a second column;

displaying, in at least one column other than the first and second columns, a subset of objects included in the first set of objects in a distinguishing manner from other objects not included in the subset of objects, wherein objects included in the subset of objects are related to the first object and the second object, wherein the objects in the columns include a plurality of hierarchically related computing resources for executing virtual machines;

detecting that a user has selected one of the objects in one of the columns; and in response to the detecting, highlighting the selected object and objects that are hierarchically related to the selected object and displayed in columns different from said one of the columns.

23. The computer-readable storage medium of claim 22, wherein another column is widened or narrowed based on receiving the selection of the first object included in the first column.

24. The computer-readable storage medium of claim 22, wherein another column is collapsed based on receiving the selection of the first object included in the first column.

25. The computer-readable storage medium of claim 22, wherein displaying the subset of objects comprises:
- removing one or more objects from a group of objects; and
- displaying the one or more objects in the distinguishing manner from other objects not included in the subset of objects.

* * * * *